United States Patent
Dixon et al.

(10) Patent No.: US 8,277,539 B2
(45) Date of Patent: Oct. 2, 2012

(54) LEACHING PROCESS FOR COPPER CONCENTRATES CONTAINING ARSENIC AND ANTIMONY COMPOUNDS

(75) Inventors: David G. Dixon, Delta (CA); Berny Rivera-Vasquez, Vancouver (CA)

(73) Assignee: The University of British Columbia (CA)

( * ) Notice: Subject to any disclaimer, the term of this patent is extended or adjusted under 35 U.S.C. 154(b) by 137 days.

(21) Appl. No.: 12/991,304

(22) PCT Filed: Apr. 17, 2009

(86) PCT No.: PCT/CA2009/000527
§ 371 (c)(1),
(2), (4) Date: Nov. 5, 2010

(87) PCT Pub. No.: WO2009/135291
PCT Pub. Date: Nov. 12, 2009

(65) Prior Publication Data
US 2011/0056331 A1    Mar. 10, 2011

Related U.S. Application Data

(60) Provisional application No. 61/050,868, filed on May 6, 2008.

(51) Int. Cl.
*C22B 3/08* (2006.01)

(52) U.S. Cl. .............................. 75/743; 423/27; 423/41

(58) Field of Classification Search .................... 75/743; 423/27, 41
See application file for complete search history.

(56) References Cited

U.S. PATENT DOCUMENTS 7,846,233 B2 * 12/2010 Dixon et al. ................... 75/373
7,892,505 B2 * 2/2011 McConnell .................... 423/27

FOREIGN PATENT DOCUMENTS

| CN | 1358871 | 7/2002 |
| WO | 0131072 | 5/2001 |
| WO | 2005118894 | 12/2005 |
| WO | 2007093667 | 8/2007 |

OTHER PUBLICATIONS

Abraitis P.K. et al., Variations in the compositional, textural and electrical properties of natural pyrite: a review. Int. J. of Min. Processing, vol. 74, Iss. 1-4, Nov. 2004, p. 41-59.

* cited by examiner

*Primary Examiner* — George Wyszomierski
*Assistant Examiner* — Tima M McGuthry Banks
(74) *Attorney, Agent, or Firm* — Kilpatrick Townsend & Stockton LLP.

(57) ABSTRACT

A method of recovering copper from a copper sulfide concentrate comprising a copper arsenic sulfosalt or a copper antimony sulfosalt, using pyrite as a catalyst. The concentrate and pyrite are added to an acidic sulfate leach solution. The copper is leached from the concentrate, in the presence of an oxygen-containing gas, under conditions whereby the pyrite is substantially unoxidized. The pyrite:copper sulfide ratio of the pyrite being added to the copper sulfide present in the concentrate being added is at least 1:3. The pyrite may be maintained at a concentration in the leach solution of at least 9 grams per liter. The leached copper is recovered from the solution by conventional methods.

45 Claims, 3 Drawing Sheets

LEACHING PROCESS FOR COPPER CONCENTRATES CONTAINING ARSENIC AND ANTIMONY COMPOUNDS

This application is a national stage of PCT/CA09/00527, filed Apr. 17, 2009, which claims benefit to U.S. provisional application 61/050,868, filed May 6, 2008.

TECHNICAL FIELD

The invention pertains to methods for leaching copper from concentrates containing copper arsenic sulfosalt and copper antimony sulfosalt minerals.

BACKGROUND

Copper sulfides containing arsenic or antimony are commonly-occurring minerals. Arsenic-containing copper sulfides include sulpharsenites, such as enargite ($Cu_3AsS_4$), and sulpharsenates, such as tennantite ($Cu_{12}As_4S_{13}$). Antimony-containing copper sulfides include sulfantimonites, such as famatinite ($Cu_3SbS_4$), and sulphantimonates, such as tetrahedrite ($Cu_{12}Sb_4S_{13}$). It is difficult to recover the copper from such minerals. For example, enargite has proven resistant to virtually every leaching process other than high pressure oxidation in autoclaves with oxygen at temperatures exceeding 200° C., which is not an economic process. Mines that process ore in smelters often pay penalties if the ore they ship to the smelter contains enargite, due to high arsenic levels.

It would be desirable to be able to recover copper from mineral concentrates containing copper arsenic sulfosalt and copper antimony sulfosalt minerals by an economically viable, hydrometallurgical process.

SUMMARY OF THE INVENTION

The invention provides a hydrometallurgical method for extracting copper from copper concentrates containing copper arsenic sulfosalt or copper antimony sulfosalt minerals by a leaching process which uses pyrite ($FeS_2$) as a catalyst for the leaching reaction. The leaching step is carried out in an acidic sulfate leach solution, for example a ferric sulfate medium, under conditions whereby the pyrite is not materially oxidized. The process includes the application of an oxidizing agent, e.g. oxygen in the form of air or oxygen gas.

Once the copper is leached from the concentrate, it can be recovered by conventional methods, such as solid-liquid separation, solvent extraction (SX) and electrowinning (EW).

According to one embodiment of the invention, there is provided a method of recovering copper from a copper sulfide concentrate comprising one of a copper arsenic sulfosalt and a copper antimony sulfosalt. The concentrate and pyrite are added to an acidic sulfate leach solution, the concentrate and the pyrite being in particulate form. Copper is leached from the concentrate in the leach solution, in the presence of an oxygen-containing gas, under conditions whereby the pyrite is substantially unoxidized, to produce a solution containing copper ions. The leached copper is then recovered from the solution.

In one embodiment of the invention, the pyrite:copper sulfide ratio of the pyrite being added to the copper sulfide present in the concentrate being added is at least 1:3, or alternatively in the range of 1:3 to 20:1, or alternatively in the range of 1:1 to 10:1, or alternatively in the range of 3:1 to 5:1.

According to another embodiment, the pyrite is maintained at a concentration in the leach solution of at least 9 grams per liter, or alternatively at some higher concentration.

These and other features of the invention will be apparent from the following description and drawings of the preferred embodiments.

DETAILED DESCRIPTION OF THE PREFERRED EMBODIMENTS

Figure 1:
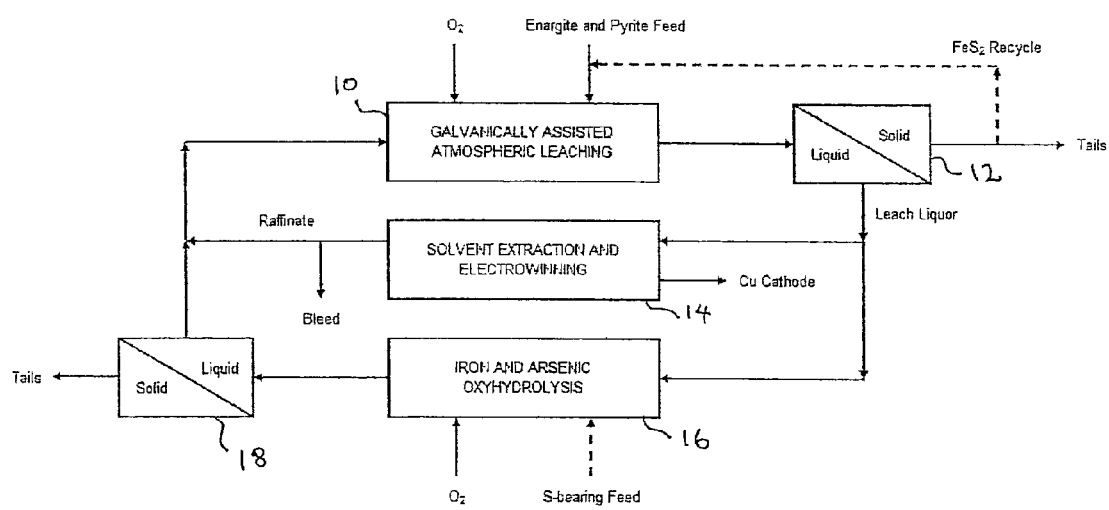
FIG. 1 is a flow sheet for the process of leaching copper from enargite.

The process of the invention is described below in respect of the recovery of the copper from enargite, as an example of the copper sulfide minerals to which the process can be applied.

The Leaching Reaction

In one embodiment of the copper-recovery method, particulate pyrite and particulate enargite concentrate are added to an acidic sulfate leach solution. The weight ratio of the pyrite to the enargite present in the enargite concentrate is at least 1:3. The copper is leached in the presence of an oxygen-containing gas, under conditions whereby the pyrite is substantially unoxidized, producing a solution containing copper ions. The leached copper is then recovered from the solution.

Alternatively, rather than directly controlling the weight ratio of pyrite to enargite being added to the leach solution, the method can include the step of maintaining the pyrite in the leach solution at a suitable concentration, by the addition of pyrite as the leaching reaction proceeds. In this embodiment of the method, particulate enargite concentrate and particulate pyrite are added to an acidic sulfate leach solution. The copper is leached from the enargite concentrate, in the presence of an oxygen-containing gas, under conditions whereby the pyrite is substantially unoxidized, while maintaining the pyrite at a concentration of at least 9 grams per liter of the leach solution, alternatively at least 10, 16, 31, 40, 44, 47, 63 or 78 grams per liter. The copper is then recovered from the leached solution.

The leaching process is carried out using a mixture comprising particulate enargite concentrate and particulate pyrite. Reference herein to such a "mixture" includes both compositions in which the pyrite is specifically added to the concentrate and those where it is already present in the concentrate at a sufficient level and therefore does not have to be added. Where the pyrite must be added, the mixture of enargite concentrate and pyrite can be prepared and then added to the leach solution, or alternatively each may be added separately to the leach solution.

In the method of the invention, pyrite is believed to act as a provider of an alternative surface for ferric reduction. Pyrite is most effective as a galvanic catalyst when it behaves strictly as a cathode. Hence, the leaching process is carried out under conditions in which the pyrite is not oxidized to any substantial extent, i.e. not to an extent that is material to the effective functioning of the process, and preferably not at all. This can be done by maintaining the solution potential below a certain level. The maximum operating solution potential (i.e. the potential at which the process is carried out) is less than about 500 mV versus Ag/AgCl (all solution potentials stated herein are expressed in relation to the standard Ag/AgCl reference electrode). Preferably, the operating solution potential is between about 400 mV and 550 mV and more preferably between about 460 mV and 500 mV.

In order not to exceed a certain solution potential in a ferric leaching reactor, one must ensure that the supply of ferric does not exceed the demand. In the present system, this means that the overall leaching reaction:

$$2Cu_3AsS_4(s)+9Fe_2(SO_4)_3(aq)+6H_2O(l)\rightarrow 6CuSO_4(aq)+2H_3AsO_3(aq)+18FeSO_4(aq)+3H_2SO_4(aq)+8S^0(s)$$

must be intrinsically faster than the ferrous oxidation reaction with dissolved oxygen gas:

$$4FeSO_4(aq)+O_2(aq)+2H_2SO_4(aq)\rightarrow 2Fe_2(SO_4)_3(aq)+2H_2O(l)$$

Assuming that the proper set of operating variables has been identified in order to maximize the intrinsic leaching rate (i.e. pyrite:enargite ratio, particle size, acid level, and temperature), then it is a matter of engineering design to select appropriate levels of pulp density, oxygen flow rate, and agitation intensity such that the supply of ferric does not exceed the demand in any part of the leaching circuit.

The leaching process may be carried out on a batch basis or as a continuous process, the latter being preferred. In batch mode, as the level of enargite in the leaching reactor (and, concurrently, the demand for oxidant) diminishes with time, it may be necessary to regulate the flow of oxygen to the reactor to prevent the solution potential from exceeding the desired maximum, particularly when pure oxygen gas rather than air is used. Alternatively, in a continuous process consisting of a number of leaching tanks in series, one would simply supply oxygen to each tank at the appropriate rate. This may be facilitated in practice by supplying pure oxygen or oxygen-enriched air to the first one or two tanks and air to the remaining tanks, or running the final tank without oxygen.

Also, in batch mode, it is desirable that the leach solution have an initial iron level of at least 5 grams per litre to initiate the leaching process.

An example of a process flowsheet for carrying out the process on a continuous basis, and recovering the extracted copper, is shown in FIG. 1. The process involves three basic steps, namely, leaching 10, copper recovery (by SX-EW) 14, and iron rejection and optional makeup acid generation (by oxyhydrolysis) 16. Optional flow streams are indicated in dotted lines. In the leach reactor, copper is leached from enargite selectively at low potential in the presence of pyrite catalyst, producing a solid sulphur residue, while ferrous is oxidized to ferric with dissolved oxygen gas:

Leaching: $2Cu_3AsS_4(s)+9Fe_2(SO_4)_3(aq)+6H_2O(l)$
$\rightarrow 6CuSO_4(aq)+2H_3AsO_3(aq)+18FeSO_4(aq)+3H_2SO_4(aq)+8S^0(s)$ Ferrous oxidation: $4FeSO_4(aq)+O_2(aq)+2H_2SO_4(aq)$
$\rightarrow 2Fe_2(SO_4)_3(aq)+2H_2O(l)$ Overall: $4Cu_3AsS_4(s)+9O_2(aq)+12H_2SO_4(aq)$
$\rightarrow 12CuSO_4(aq)+4H_3AsO_3(aq)+6H_2O(l)+16S^0(s)$ In the process shown in FIG. 1, a bulk concentrate having a pyrite:enargite ratio of between about 1:3 and about 20:1 is subjected to the leaching process. Alternatively, the pyrite: enargite ratio is between about 1:1 and 10:1 or between about 3:1 and 5:1. The provenance of the pyrite present in the concentrate is not important. Additional pyrite can be added from an external source or recycled to make up the desired ratio in the bulk concentrate or, if appropriate, a bulk concentrate can be made from an ore sample that is naturally rich in pyrite, with further enrichment from an external pyrite source if necessary. Other copper or base metal sulfides can also be present in the concentrate being leached.

The leaching process is run at temperatures between about 50° C. and the melting point of sulphur (about 110 to 120° C.). Alternatively, it can be run at a temperature of between about 70° C. and the melting point of sulphur. The leaching process can be run under any pressure between about atmospheric pressure and those pressures attainable in an autoclave. Preferably, it is run under about atmospheric pressure.

The leaching process is run under an atmosphere of oxygen-containing gas such as air, oxygen-enriched air, substantially pure oxygen, or any combination thereof, in a series of leaching tanks. Given the relatively modest oxygen requirements of the process, this oxygen gas can also be supplied by a low-cost VPSA plant, or by a more conventional cryogenic oxygen plant for larger applications.

Ultrafine grinding of the concentrate or the pyrite is not necessary, though the process will work with ultrafine materials. In this specification, the term P80 describes the particle size at which 80% of the mass of material will pass through the specified size of mesh. For use in the leaching process, the P80 particle size of the enargite concentrate can vary over a wide range. For example, a P80 particle size of about 210 microns can be used. Preferably, the enargite particle size is below about 106 microns, or alternatively below about 75 microns, or alternatively below about 38 microns. The pyrite particle size may be the same as or less than the enargite particle size. Alternatively the P80 particle size of both the enargite concentrate and the pyrite may be in the range of 38 to 106 microns.

The leach can be run at any pulp density that will seem reasonable to one skilled in the art. For example, the pulp density may be about 9% or higher. Higher pulp densities facilitate the control of solution potential by ensuring high ferric demand and may also enhance the effectiveness of the galvanic couple between pyrite and enargite. Higher pulp densities also require smaller, more economical leach tanks.

According to the overall leach stoichiometry given above, at least one mole of sulphuric acid should theoretically be added to the leach for every mole of copper recovered from the enargite. In practice, however the acid requirement may fluctuate depending on the exact composition of the concentrate and the degrees of sulphur and ferrous oxidation and iron precipitation that occur during the leach. Preferably, at least one mole of sulfuric acid is added for every mole of copper recovered.

Solid-Liquid Separation and Solvent Extraction

Following the leaching process, copper is extracted from the leach solution. After a solid-liquid separation step (12 in FIG. 1), producing a liquid solution containing the copper, the liquid solution is subjected to conventional solvent extraction and electrowinning (14) to produce pure copper cathodes according to the following overall reaction.

SX-EW: $CuSO_4(aq)+H_2O(l)\rightarrow Cu(s)+H_2SO_4(aq)+\frac{1}{2}O_2(aq)$

Oxyhydrolysis

In order to reject iron and to recover the remainder of the acid, a raffinate bleed stream is subjected to oxyhydrolysis (16) with oxygen gas to oxidize ferrous to ferric and form a stable ferric precipitate. One preferred method involves the formation of hematite thus:

Iron oxyhydrolysis: $FeSO_4(aq)+\frac{1}{4}O_2(g)+H_2O(l)$
$\rightarrow \frac{1}{2}Fe_2O_3(s)+H_2SO_4(aq)$ This process requires a small amount of oxygen gas, which can be supplied from a low-cost vapor pressure swing absorption (VPSA) plant. The hematite is removed from the leach circuit in a solid-liquid separation step (18) following the oxyhydrolysis.

Trivalent arsenic in the leach solution is oxidized to the pentavalent state by ferric and precipitated as ferric arsenate, $FeAsO_4$ (scorodite) during the oxyhydrolysis step:

Arsenic oxyhydrolysis: $2H_3AsO_3(aq)+3Fe_2(SO_4)_3(aq)+2H_2O(1) \rightarrow 2FeAsO_4(s)+4FeSO_4(aq)+5H_2SO_4(aq)$ Scorodite is a stable compound which can be safely discharged to a tailings impoundment.

Example 1

Figure 2:
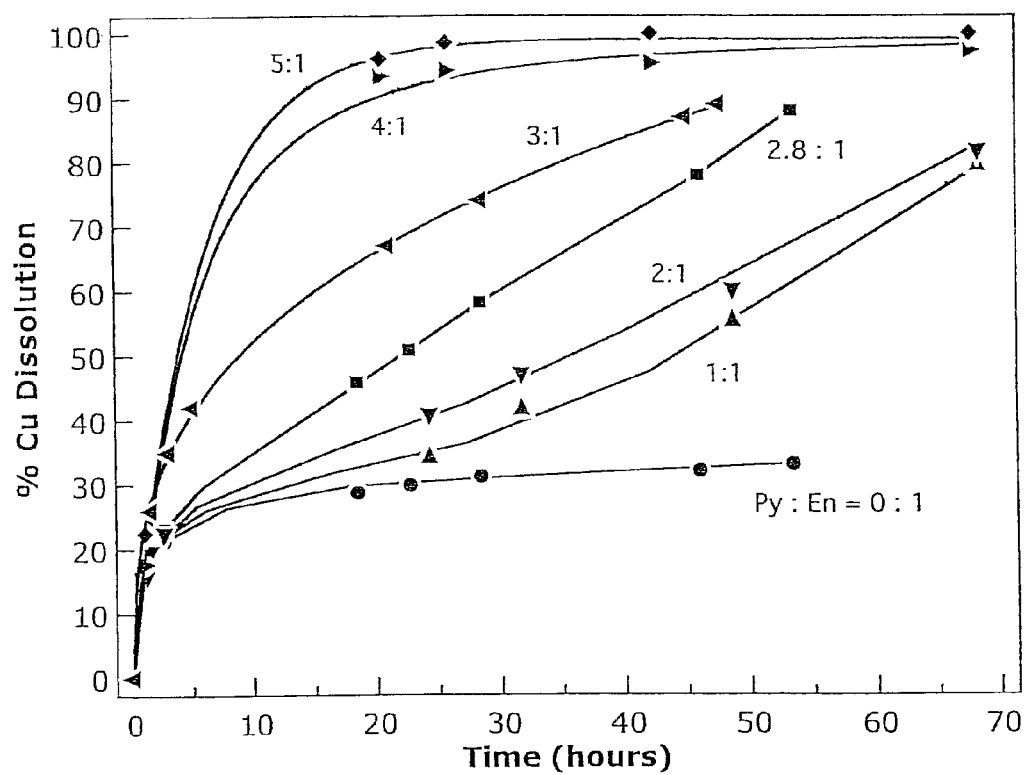
FIG. 2 is a graph showing copper recovery versus leaching time for enargite with pyrite and for enargite alone.

Copper leaching tests were performed on samples of a nearly pure enargite (En) sample (from the Leonard Mine near Butte, Mont.), which contained 41% copper (pure ideal enargite contains 46.1% copper) with additions of nearly pure pyrite (from the Huanzala district of Peru). Six tests were run in 1600 mL of solution under identical conditions (480 mV vs Ag/AgCl, 80° C., 20 g total dissolved Fe, 60 g total $H_2SO_4$, oxygen gas, 1200 rpm agitation speed). 25 g of the enargite sample was used in each test with mass additions of pyrite (Py) in the following seven pyrite to enargite ratios: 0:1, 1:1, 2:1, 2.8:1, 3:1, 4:1 and 5:1, corresponding to pyrite concentrations of approximately 0, 16, 31, 44, 47, 63 and 78 g/L respectively. The copper extraction was measured at intervals. The results are shown in FIG. 2.

In the absence of pyrite, the leach rate reached a plateau after about 30 hours, with less than 30% of the copper extracted. Increasing the pyrite to enargite mass ratio had a significant effect on leach kinetics. The effect was particularly dramatic at 4:1 and above, at which the enargite leaching was essentially complete within about 25 hours.

Example 2

A copper leaching test was run on a 180 g sample of concentrate having the following mineral composition:

| Mineral | Ideal Formula | Mass % |
|---|---|---|
| Chalcopyrite | $CuFeS_2$ | 18.5 |
| Pyrite | $FeS_2$ | 42.4 |
| Tennantite | $Cu_{12}As_4S_{13}$ | 5.4 |
| Sphalerite | $(Zn,Fe)S$ | 25.8 |
| Galena | $PbS$ | 0.2 |
| Anglesite | $PbSO_4$ | 2.3 |
| Plagioclase | $NaAlSi_3O_8$—$CaAl_2Si_2O_8$ | 1.8 |
| Quartz | $SiO_2$ | 1.4 |
| Gypsum | $CaSO_4 \cdot 2H_2O$ | 2.2 |
| Total | | 100 |

Figure 3:
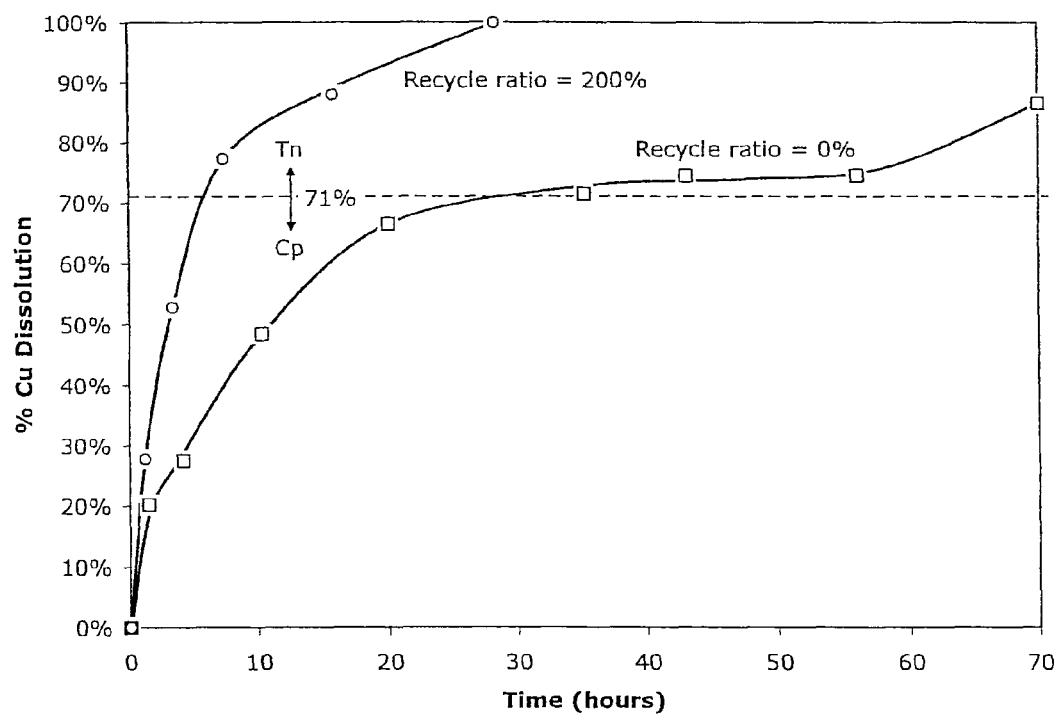
FIG. 3 is a graph showing copper recovery versus leaching time for a concentrate containing tennantite, chalcopyrite and pyrite.

The test was run in 1600 mL of solution under the following conditions: 480 mV vs Ag/AgCl, 80° C., 20 g total dissolved Fe, 80 g total $H_2SO_4$, oxygen gas, 1200 rpm agitation speed. Based on the ideal mineral formulae given above, approximately 29% of the Cu in the sample occurred as tennantite (Tn), and the remaining 71% occurred as chalcopyrite (Cp). The chalcopyrite was leached rapidly (within about 20 hours) at the prevailing pyrite (Py) content of 42.4%, or approximately 48 g/L pyrite concentration, but tennantite failed to leach significantly during the first 58 hours of the test, and was only about half leached when the test was terminated after 70 hours. The results are shown by the "Recycle ratio=0%" line in FIG. 3.

A second 180 g batch of sample was added to the residue from the test described in the preceding paragraph, and leached under the same conditions for 75 hours (results not shown). Then, a third 180 g batch of sample was added to the residue of the second test, and leached for another 53 hours. Hence, this third test represents a pyrite recycle ratio of 200%. Assuming no oxidation of the pyrite, the pyrite concentration in this test was approximately 144 g/L. The results are shown by the "Recycle ratio=200%" line in FIG. 3. The chalcopyrite was leached from this batch within about 5 hours, and the tennantite required roughly another 23 hours to leach to completion. Hence, increasing the pyrite concentration by a factor of three decreased the time required for complete leaching of both tennantite and chalcopyrite by roughly a factor of three.

Although the invention has been described in terms of various embodiments, it is not intended that the invention be limited to these embodiments. Various modifications within the scope of the invention will be apparent to those skilled in the art. The scope of the invention is defined by the claims that follow.

The invention claimed is:

1. A method of recovering copper from a copper sulfide concentrate comprising a copper sulfide, wherein the copper sulfide includes one of a copper arsenic sulfosalt and a copper antimony sulfosalt, comprising the steps of:
    (a) adding the concentrate and a pyrite to an acidic sulfate leach solution, the concentrate and the pyrite being in particulate form, wherein a pyrite:copper sulfide weight ratio of the pyrite and the copper sulfide added to the leach solution is at least 1:1;
    (b) leaching the copper from the concentrate in the leach solution, in the presence of an oxygen-containing gas, under conditions whereby the pyrite is substantially unoxidized, to produce a solution containing copper ions; and
    (c) recovering the leached copper from the solution.

2. A method according to claim 1, wherein the copper sulfide concentrate comprises a copper arsenic sulfosalt selected from one of a sulfarsenite and a sulfarsenate.

3. A method according to claim 2, wherein the copper sulfide concentrate comprises enargite.

4. A method according to claim 2, wherein the copper sulfide concentrate comprises tennantite.

5. A method according to claim 2, wherein the pyrite is maintained at a concentration in the leach solution of at least 9 g/L.

6. A method according to claim 2, wherein the pyrite is maintained at a concentration in the leach solution that is at least as high as one of 10, 16, 31, 40, 44, 47, 63 and 78 g/L.

7. A method according to claim 2, wherein the pyrite: copper sulfide weight ratio is in the range of 1:1 to 20:1.

8. A method according to claim 2, wherein the pyrite: copper sulfide weight ratio is in the range of 1:1 to 10:1.

9. A method according to claim 2, wherein the pyrite: copper sulfide weight ratio is in the range of 3:1 to 5:1.

10. A method according to claim 2, wherein the concentrate and the pyrite are added in the form of a mixture.

11. A method according to claim 2, wherein at least some of the pyrite that is added is recycled pyrite obtained from the leach solution following a solid-liquid separation step.

12. A method according to claim 2, wherein the conditions comprise maintaining an operating potential of the leach solution such that the pyrite is substantially unoxidized.

13. A method according to claim 12, wherein the operating potential is 500 mV or less versus Ag/AgCl.

14. A method according to claim 12, wherein the operating potential is between 400 and 550 mV versus Ag/AgCl.

15. A method according to claim 12, wherein the operating potential is between 460 and 500 mV versus Ag/AgCl.

16. A method according to claim 2, wherein the maintaining of the operating potential is carried out by means of selecting one or more of:
   (i) the ratio of the concentrate to the pyrite;
   (ii) the particle size of the concentrate and the pyrite;
   (iii) an acid concentration of the leach solution; and
   (iv) a temperature of the leach solution.

17. A method according to claim 2, further comprising the step of selecting one or more of:
   (i) pulp density level,
   (ii) oxygen flow rate, and
   (iii) intensity of agitation of the leach solution, to control the operating potential.

18. A method according to claim 2, wherein step (b) is carried out at atmospheric pressure.

19. A method according to claim 2, wherein step (b) is carried out above atmospheric pressure.

20. A method according to claim 2, wherein step (b) is carried out at a pulp density of 9% solids or higher.

21. A method according to claim 2, wherein step (c) comprises a solvent extraction step and electrowinning.

22. A method according to claim 21, wherein ferrous ions in a raffinate stream from the solvent extraction step are oxidized to ferric ions by oxygen gas and precipitated as a stable ferric salt.

23. A method according to claim 2, wherein the pyrite is present in an ore from which the concentrate is prepared.

24. A method according to claim 1, wherein the copper sulfide concentrate comprises a copper antimony sulfosalt selected from one of a sulfantimonite and a sulfantimonate.

25. A method according to claim 24, wherein the copper sulfide concentrate comprises famatinite.

26. A method according to claim 24, wherein the copper sulfide concentrate comprises tetrahedrite.

27. A method according to claim 24, wherein the pyrite is maintained at a concentration in the leach solution of at least 9 g/L.

28. A method according to claim 24, wherein the pyrite is maintained at a concentration in the leach solution that is at least as high as one of 10, 16, 31, 40, 44, 47, 63 and 78 g/L.

29. A method according to claim 24, wherein the pyrite: copper sulfide weight ratio is in the range of 1:1 to 20:1.

30. A method according to claim 24, wherein the pyrite: copper sulfide weight ratio is in the range of 1:1 to 10:1.

31. A method according to claim 24, wherein the pyrite: copper sulfide weight ratio is in the range of 3:1 to 5:1.

32. A method according to claim 24, wherein the concentrate and the pyrite are added in the form of a mixture.

33. A method according to claim 24, wherein at least some of the pyrite that is added is recycled pyrite obtained from the leach solution following a solid-liquid separation step.

34. A method according to claim 24, wherein the conditions comprise maintaining an operating potential of the leach solution such that the pyrite is substantially unoxidized.

35. A method according to claim 34, wherein the operating potential is 500 mV or less versus Ag/AgCl.

36. A method according to claim 34, wherein the operating potential is between 400 and 550 mV versus Ag/AgCl.

37. A method according to claim 34, wherein the operating potential is between 460 and 500 mV versus Ag/AgCl.

38. A method according to claim 34, wherein the maintaining of the operating potential is carried out by means of selecting one or more of:
   (i) a ratio of the concentrate to the pyrite;
   (ii) the particle size of the concentrate and the pyrite;
   (iii) an acid concentration in the leach solution; and
   (iv) a temperature of the leach solution.

39. A method according to claim 34, further comprising the step of selecting one or more of:
   (i) pulp density level,
   (ii) oxygen flow rate, and (iii) intensity of agitation of the leach solution, to control the operating potential.

40. A method according to claim 24, wherein step (b) is carried out at atmospheric pressure.

41. A method according to claim 24, wherein step (b) is carried out above atmospheric pressure.

42. A method according to claim 24, wherein step (b) is carried out at a pulp density of 9% solids or higher.

43. A method according to claim 24, wherein step (c) comprises a solvent extraction step and electrowinning.

44. A method according to claim 43, wherein ferrous ions in a raffinate stream from the solvent extraction step are oxidized to ferric ions by oxygen gas and precipitated as a stable ferric salt.

45. A method according to claim 24, wherein the pyrite is present in an ore from which the concentrate is prepared.

* * * * *